United States Patent

[11] 3,619,057

| [72] | Inventors | Vito E. Castellano<br>Orange;<br>Edward L. Cohn, La Mirada; Robert A.<br>Fowler, Torrance, all of Calif. |
|---|---|---|
| [21] | Appl. No. | 649,513 |
| [22] | Filed | June 28, 1967 |
| [45] | Patented | Nov. 9, 1971 |
| [73] | Assignee | North American Aviation, Inc. |

[54] GEODETIC LASER SURVEY SYSTEM
5 Claims, 3 Drawing Figs.

| [52] | U.S. Cl. | 356/5, 340/15.5 |
|---|---|---|
| [51] | Int. Cl. | G01c 3/08 |
| [50] | Field of Search | 356/4, 5; 343/14, 112.3 |

[56] References Cited
UNITED STATES PATENTS

| 3,366,957 | 1/1968 | Lode | 343/112.3 X |
| 2,472,380 | 6/1949 | Long | 356/4 X |
| 3,424,531 | 1/1969 | Bender et al. | 356/4 |
| 3,437,820 | 4/1969 | Thompson, Jr. et al. | 356/5 X |

Primary Examiner—Rodney D. Bennett, Jr.
Assistant Examiner—Brian L. Ribando
Attorneys—William R. Lane, Allan Rothenberg and Sidney Magnes ABSTRACT: Apparatus—comprising a pair of light-sources whose beams are combined, modulated, and directed to a distant retroreflector—that measures the phase-shift of the modulations on the reflected light beams in order to measure the index-of-refraction of the atmosphere and the movement, if any, of the retroreflector.

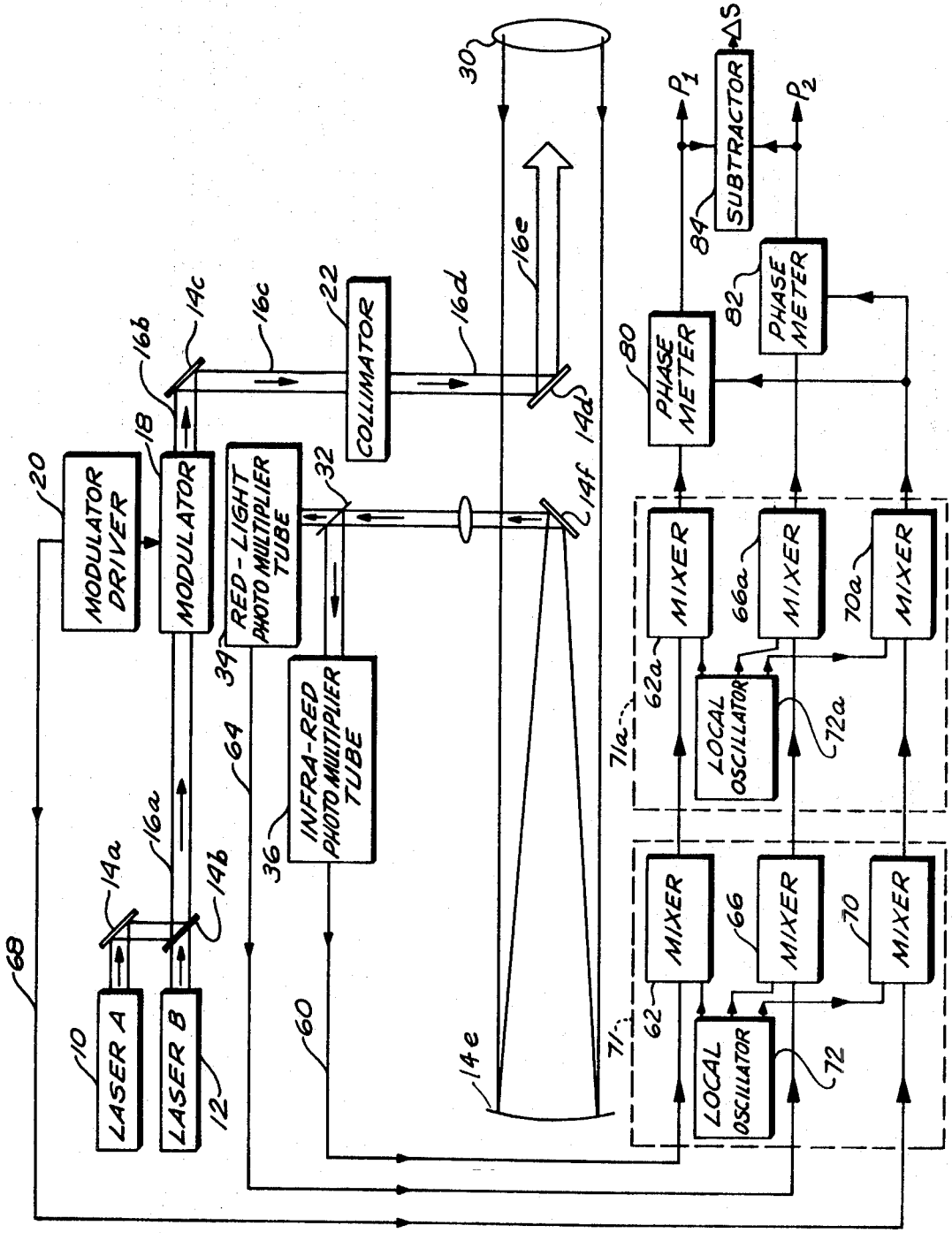

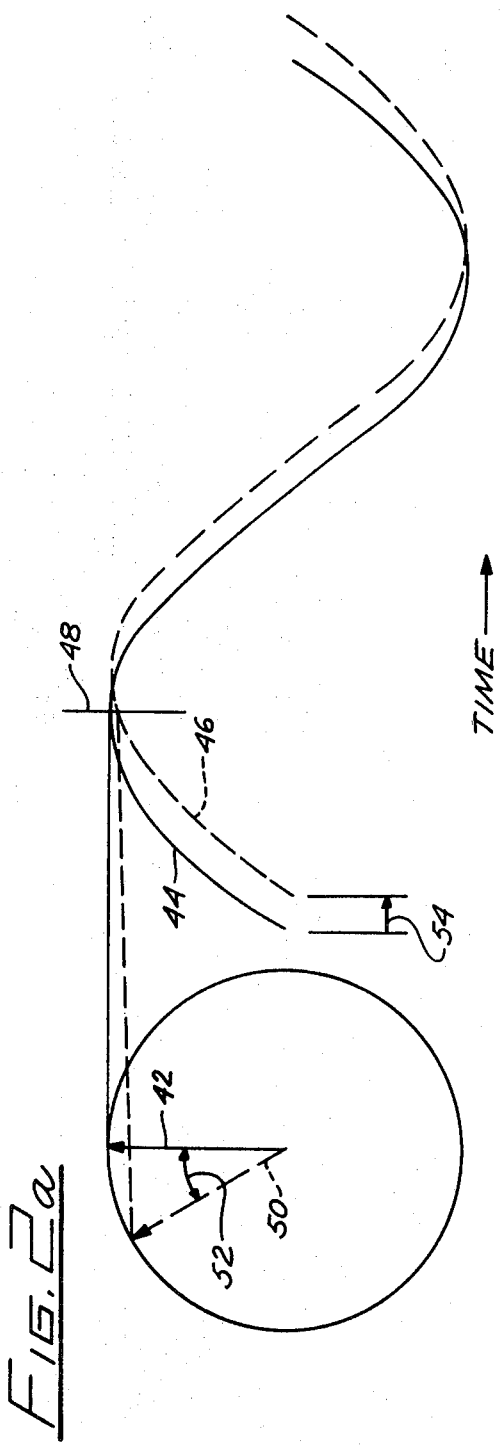
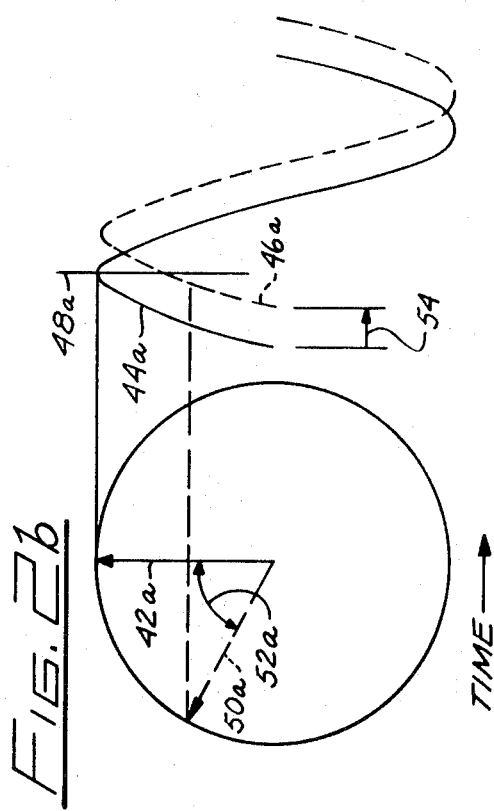

GEODETIC LASER SURVEY SYSTEM

BACKGROUND

It is becoming increasingly important to measure distances to a high degree of accuracy; and most frequently, these distance measurements are to be made between a remotely positioned location and a monitoring station. Prior-art distance measuring methods have used surveying techniques and radar techniques, but present practices obtain higher accuracy by the use of a light beam from a laser. However, the ultimate accuracy of this latter approach was being limited by the turbulence and nonhomogeneity of the atmosphere through which the light beam is propagated.

Another related distance measuring problem is to measure minute displacements, these frequently being masked by the previously mentioned atmosphere turbulence and nonhomogeneity. This problem will be more fully discussed later.

The value of measuring these minute displacements may be realized from the following discussion. It is known that an earthquake "ring" encircles the Pacific Ocean; passing through many highly populated areas in California, Alaska, Japan, Asia and South America. When earthquakes occur in these areas, the damage is tremendous; and it is therefore desirable to be able to predict iminent earthquakes, and to discover how their effects may be minimized.

Recent studies have shown that many earthquakes are preceded by minor movements of the earth's surface, these movements being particularly noticeable in the area of an earthquake "fault"; and indicating the buildup and/or releasing of earth stresses. A mountainous terrain in the area of a fault is particularly useful for measuring these minute earth movements, because a mountain peak tends to act as the outer point of a lever whose other end is buried deep in the earth. As a result, the mountain peak tends to magnify the earth's movement; and it is therefore desirable to mount movement-detecting equipment on, or near, mountain peaks.

OBJECTS AND DRAWINGS

It is therefore an object of the present invention to provide equipment for accurately measuring distance.

It is a further object of the present invention to provide equipment for measuring small movements at relatively long distances from a measuring station.

It is another object of the invention to provide equipment of the above type, for measuring small movements of the earth's surface.

The achievement of these objects, and others, will be realized from the teachings of the detailed description, taken in conjunction with the drawings of which FIG. 1 shows a schematic diagram of optical and electronic equipment for achieving the above objects; and FIGS. 2a and 2b show various waveforms used in explaining the operation of the invention.

INTRODUCTION

It is well known that the distance between various points can be measured in a number of ways; these ways including optical measurements, as used by surveyors; electronic measurements, as used in radar; and triangulation methods, as used in Loran. While the above methods—and others—provide an observer with a reasonably exact measurement of the distance between various points, they are not as accurate as is presently desirable; and do not have the ability to indicate when the remote point has moved axially a very small distance.

One way of measuring these distances is to "modulate" (to be discussed later) a beam of light from a light-source, such as a laser; to direct the modulated light beam to a mirror mounted at the point whose movement is to be detected; to then catch the reflected modulated light beam; and to compare the modulations of the reflected light beam with "reference" modulations.

In general, as long as the mirror is stationary, the reference modulations and the modulation of the reflected light beam will have a particular relationship; but as soon as the mirror moves, the modulations will have a different relationship—and the amount of movement can be obtained from the change in the modulation relationship.

Unfortunately, however, the air between the measuring station and the mirror is quite turbulent, and in constant movement; so that its light-transmitting effect, which may be called its "index-of-refraction" is constantly changing—and the changing index-of-refraction affects the outgoing and reflected light beams. As a result, therefore, the final modulation relationship is a function of two variables, i.e., it depends upon (1) the changing index-of-refraction of the atmosphere, and (2) possible movement of the mirror. Thus mirror movement may be masked by a changing index of refraction of the atmosphere.

It has been found that by using two light beams of different frequency (color), the effect of the instantaneous index of refraction may be measured; so that the distance and smaller changes of distance can be readily detected and accurately measured.

SYNOPSIS

The present invention relates to the measurement of distance, and to the measurement of small axial movements that occur at relatively long distances from the measuring station. The disclosed embodiments of the invention measure earth movements, as they may be related to the prediction of impending earthquakes.

To achieve this result, two laser beams of different frequencies are formed into a composite light beam that is modulated by a modulating signal; the composite modulated light beam being directed to, and reflected from, a mirror mounted at the point where movement is to be measured. Electrical signals corresponding to the modulations of the reflected components light beams are then compared with each other and with the modulation signal originally impressed on the outgoing light beam. The resultant modulation-relationship information provides the effects of the index-of-refraction of the air between the station and the reflector, the overall distance, and the earth-movement distance—if any.

DESCRIPTION

One embodiment of the disclosed invention achieves the desired measurement by the use of equipment shown schematically in FIG. 1. Here (for reasons to be more fully explained subsequently) two light sources, such as lasers 10 and 12, produce light beams of different frequency (or color)—such as red light and infrared light. In order to overcome the previously mentioned index-of-refraction problem (which will be more fully discussed later) the light beams from lasers 10 and 12 are combined, as indicated by mirrors 14a and 14b; and the composite light beam, indicated at 16a, is directed to a modulator 18—such as a Pockel-cell modulator or the AM4 Optical Modulator manufactured by North American Aviation, Inc.—that "amplitude modulates" the composite light beam. Broadly stated, the amplitude modulation causes the intensity of the light beam to vary, under the influence of a modulating signal from modulator-driver 20. In an extreme case of amplitude modulation, the light beam would be chopped into bursts of light and darkness; but, in this case, the amplitude of light beam 16a is modulated so that its intensity (amplitude) increases and decreases a given amount at a given modulation frequency. The modulation frequency will be further discussed subsequently.

The modulated composite light beam 16b from modulator 18 is directed, by means such as a mirror 14c, to a collimator 22; and is eventually directed as an outgoing collimated light beam 16e to the location (not shown) whose distance and/or movement is to be detected and/or measured.

At that location, a retro-reflector (which may be one, or many, of the well-known corner mirrors) reflects the modulated light beam back to the receiving station, as indicated by the incoming light beam 30 of FIG. 1. Incoming light beam 30 is directed—by suitable optical means such as mirrors 14e and 14f—to a beam-splitter 32, which may be dichroic mirror, that directs the red light component of light beam 30 to a red-light photomultiplier tube 34, and directs the infrared light component of light beam 30 to an infrared-light photomultiplier tube 36. The photomultiplier tubes 34 and 36 convert the impinging red light component and infrared light component into electrical signals whose intensity variations and frequencies correspond to the intensity variations and frequency of the modulations on these light components in incoming light beam 30. A subsequent discussion will explain why these modulations are different, and their significance.

A slight digression becomes necessary at this point, in order to discuss the modulation signal its frequency, its effect, and its usefulness in distance measurement. It is well known that an electrical signal may vary at a desired frequency; for example, the usual electricity provided by a commercial power station varies at the rate of sixty cycles per second—whereas the electricity provided by an airplane power generator generally varies at the rate of four hundred cycles per second. It is also known that each frequency has an inherent "wavelength" associated with it, the wavelength becoming shorter as the frequency increases.

It is known, moreover, that these frequencies and wavelengths may be visualized in different ways; and FIG. 2 shows two related ways of visualizing the electrical signals. In FIG. 2a, solid line 42 (which may be called a "vector") may be visualized as rotating clockwise in the manner of a wheel spoke; its rotational rate (revolutions per second) corresponding to the frequency (cycles per second) of the electrical signal. As solid-line vector 42 rotates, its outer end cyclically varies above and below the hub of the imaginary wheel; and if the instantaneous positions of the vector's outer end are plotted—against time—in the form of a graph, they produce the solid-line waveform 44 known as a "sinewave." The distance between the beginning and the end of one cycle of the sinewave corresponds to the previously discussed wavelength. Thus, the solid-line waveform 44 may be visualized as one cycle of an electrical signal that is varying at a given frequency.

Referring back to FIG. 1, it will be recalled that as the light from lasers 10 and 12 are passed through modulator 18 in the form of a combined light beam, the intensity of the exiting combined light beam 16b varies at a frequency and amplitude controlled by the modulating signal from modulator-driver 20; thus producing a result similar to solid-line waveform 44 of FIG. 2a. The light beam itself is known as the "carrier," and the variations of the carrier are known as the "modulations."

In accordance with the previous discussion of FIG. 1, a modulated light beam 16e is directed outwardly toward a reflector; and is reflected, as light beam 30, from the reflector back to the originating station. At the measuring station, for reasons to be discussed later, the modulations of the reflected beam are to be compared with the modulation signal obtained directly from modulator-driver 20.

Assume, for simplicity, that a single monochromic light beam is modulated with a modulation signal having a particular (but presently undefined) wavelength; and that a particular (but presently undefined) path-length exists for this emitted and reflected light beam. At the receiving station, the modulation on the reflected light beam is compared (in a manner to be discussed later) with the modulating signal. As a result of the above assumptions, each portion of the reflected light beam modulation will exactly match, timewise, with a corresponding portion of the modulating signal. This exact-match condition is known as an "in-phase" relation. Under these assumed conditions, the wavelength (which can be calculated from the modulation frequency) is equal to the pathlength—which may therefore be "measured" in this way.

Assume now that the reflector moves slightly, so that the emitted and reflected light beam traverses a slightly different pathlength. As a result, at the monitoring station, the reflected light beam modulation no longer exactly matches the modulating signal; and this "out-of-phase" condition is also portrayed in FIG. 2a.

As previously indicated, the solid-line waveform 44 of FIG. 2a may represent the modulating signal; and the dashed-line waveform 46 may represent the out-of-phase modulation of the reflected light beam. It will be seen from FIG. 2a that if the two waveforms 44 and 46 do not match—i.e., are not in-phase; and if they are compared at a given instant, as indicated by line 48, there will be a difference in the amplitudes of their modulations at that particular instant.

Since the amplitude difference varies with the portion of the waveforms being compared, this so-called "phase difference" is preferably expressed as a "phase-angle" 52 between the solid-line vector 42 and the dashed-line vector 50.

The condition portrayed in FIG. 2a would be produced by an increased distance, indicated by reference character 54; that is, if the retro-reflective mirror moved away from the measuring station. If phase angle, mirror had moved farther away, the distance represented at 54 and by phase-angle 52 would be larger; whereas if the mirror had moved closer to the measuring station, the distance represented at 54 would have been to the left, and the phase-angle 52 would have been clockwise of line 42. Thus, the distance and direction of mirror movement is indicated by phase-angle 52.

It will be noted that phase-angle 52 indicates a distance; and therefore the previously discussed in-phase condition is not essential for distance measurement. Instead, a knowledge of the wavelength used, and of the phase-angle, permits one to compute the distance by noting the deviation from the in-phase condition. The accuracy depends, to a great extent, upon the accuracy of the phase-angle measurement. Thus, two modes of operation may be used for distance measurements. (1) The modulation-signal frequency may be continuously variable to provide in-phase conditions for a variety of distances; or (2) selected frequency modulation signals may be used, that—taken in conjunction with phase-angle measurements—provide out-of-phase conditions that permit computation of the distances.

Referring now to FIG. 2b, it will be seen that this also represents the modulating signal and the modulations of the reflected light beam; corresponding portions being similarly numbered, except that in FIG. 2b they now have the suffix "a."In FIG. 2b the modulations have a higher frequency, and therefore a shorter wavelength than the situation previously discussed. FIG. 2b represents the same change 54 in optical pathlength; but, because of the higher frequency and shorter wavelength of the modulating signal, the same change of distance is now represented by a larger phase-angle 52a.

It is well known that a large phase-angle such as 52a of FIG. 2b is more easily measured than a small phase-angle such as 52 of FIG. 2a. Therefore, in order to measure small changes of the optical pathlength, it is advantageous to use a modulating signal of a very high frequency—having a shorter wavelength—as illustrated in FIG. 2b.

The use of a short wavelength has another advantage. Since the phase angle may represent 360°, a one-degree phase-angle represents 1/360 of a wavelength. Thus, if the modulating wavelength were twenty miles long, a one-degree phase angle would represent about 300 feet. Therefore, the pathlength might change 200 feet; and the monitoring station could not detect the difference. If, however, the modulating wavelength were 10 feet long, a one-degree phase-angle would represent about one-third of an inch; and a minute change in pathlength could be detected. It should be realized that the light beam is reflected, so that a one-inch pathlength change corresponds to a one-half inch mirror movement.

Referring back to FIG. 1, in accordance with the previous discussion, modulator 18 therefore preferably uses a modulating of a very high frequency. A 100 megacycles per second modulating frequency is used in current equipment, in order to measure extremely small changes in optical pathlength.

Another digression becomes necessary at this time. It will be realized that as a light beam travels from its point of origin to a mirror that may be as much as 10 miles away, and then travels back to its receiving station, the light beam in its 20-mile round trip will be exposed to some areas where the air is turbulent, to other areas where the air may be moving up and down, and to still other areas where the air will be blowing crosswise in the form of a wind. All of these different air movements, as well as temperature variations, affect the transmission of the light beam; and the sum total of these disturbances may be considered as causing "index-of-refraction changes" of the air over this particular path. It should be also noted that many of these disturbances are momentary and changeable, so that the index-of-refraction over this path may change from instant to instant.

The changes of the index-of-refraction effectively changes the optical pathlength; thus introducing the following problem. Assume that at the receiving station, the reflected light beam indicates that its modulation has experienced a phase-shift. The question then arises as to whether the phase shift was caused by an actual movement of the mirror, or by a change of the index-of-refraction of the optical path.

It can be shown that for technical reasons (which may be stated as having a single equation containing two variables) this problem can be approximated, but not solved, with a single light beam. However, by the use of two light beams having different frequencies (colors), the problem may be solved because each frequency (or color) of light has its own individual index-of-refraction during the transmission along the optical path. Technically speaking, this two-beam arrangement provides two equations containing two variables; so a solution is now possible.

Since a given instantaneous atmospheric condition produces a different instantaneous index-of-refraction for each light component, each light component has a different optical pathlength ($P_1$, $P_2$) for the same length (L) of physical distance; the differences between the optical pathlengths and the physical distance being designated $S_1$ and $S_2$ ($S=P-L$, or $P=L+S$). Because each light component traverses an optical path of a different length, the phases of the reflected light components are different at the receiving station; and analyzing the resultant phase relations provides index-of-refraction and distance information, as will be discussed later. Thus, the use of two different-frequency light components permits correction for atmospheric effects; and this is accomplished as follows.

Referring back to FIG. 1, the output signals from photomultiplier tubes 34 and 36 contain information about the phase of the modulation on the reflected red and infrared light components; and the phase relations may be expressed in terms of phase angles, as previously discussed. Unfortunately, however, there is no readily available equipment for measuring phase-angles at such high frequencies as the modulation signal; and FIG. 1 shows circuitry for converting the high-frequency phase-angle information to low-frequency phase-angle information that can be read out by available equipment.

Another digression becomes necessary at this point. The previously discussed changes in optical pathlengths have been shown to correspond to phase angles, and these phase angles are to be measured; and it has also been indicated above that while the phase angle is available at a high frequency, it is most conveniently measured at a lower frequency. Therefore, the problem to be solved is that of converting a phase angle at a high frequency to a phase angle at a low frequency.

The circuitry of FIG. 1 solves this problem by the use of a technique known as "heterodyning." Basically, in the heterodyning technique, two signals are applied to an electronic circuit known as a 37 mixer"; and the mixer produces two output signals—the frequency of one output signal corresponding to the sum of the frequencies of the input signals, and the frequency of the other output signal corresponding to the difference between the frequencies of the input signals. Either of these mixer output signals may be used in subsequent circuitry.

As explained previously, the infrared-light photomultiplier tube 36 of FIG. 1 converts the impinging modulated infrared-light reflected light component to an electrical signal, this electrical signal corresponding in phase and frequency to the modulation on the reflected infrared light component of light beam 30; and this electrical signal is applied over wire 60 to a mixer 62. Similarly, the red-light photomultiplier tube 34 converts the impinging modulated red-light reflected light component to a second electrical signal that corresponds in phase and frequency to the modulation on the reflected red light component of light beam 30; and this second electrical signal is applied over wire 64 to a second mixer 66. For reasons to be discussed subseqeuntly, the modulating signal from modulator-driver 20 is applied over wire 68 to a third mixer 70.

It should be noted that because (see FIG. 1) the combined red and infrared light beam 16b was modulated by a common modulator signal, the modulations of both the red and the infrared reflected light components have the same frequency as the modulation signal.

It was previously pointed out that the heterodyning technique requires that a mixer circuit receive two signals having two separate frequencies; and therefore a local oscillator 72 is used to provide a second signal, of a desired frequency. In accordance with the previously discussed heterodyning technique, the signal from local oscillator 72 is applied to mixers 62, 66, and 70; these mixers now having applied to them two different signals having different frequencies—the signals from the photomultiplier tubes and the modulator driver having the same frequency, and the signal from local oscillator 72 having a different predetermined frequency. Therefore, each mixer produces an output signal whose frequency is the difference between the frequency of the local oscillator-signal and the frequency of the phototube or modulator-driver signal applied to the mixer. Thus, the mixer signals produced by mixers 62, 66, and 70 are all of the same frequency.

Returning now to a continued discussion of FIG. 1, because of the index-of-refraction problem mentioned above, the time-wise state of the mixer signal from the "infrared-mixer" 62 will be somewhat different than the time-wise state of the mixer signal obtained from the "red-mixer" 66. It should be also noted that in FIG. 1, there is a mixer output signal from infrared-mixer 62, another mixer output signal from red-mixer 66, and a third mixer output signal from modulator-signal mixer 70.

It has been found that the heterodyning process retains the phase-angles between the high-frequency mixer-input signals; therefore, the same phase-angles appear between the lower-frequency mixer output signals.

The above discussion has shown how a phase-angle which cannot be measured at a high frequency may be converted to the same phase-angle at a lower frequency; but in the present case the phase-angle between the mixer-output signals obtained from mixers 62 and 70, and 68 and 70, are still at too high a frequency to be measured by commercially available equipment. Therefore, in FIG. 1, the heterodyning process performed in heterodyner 71 is repeated one or more additional times, as may be necessary, in order to bring the phase-angle measurement within the range of available equipment.

In order to measure the actual phase and phase-differences of the modulation on the light beams, a first phase-meter 80 receives the heterodyned mixer signal corresponding to the infrared light component, and also receives the heterodyned mixer signal corresponding to the modulator-driver 20; phase-meter 80 indicating a phase-angle for the modulations on reflected infrared light component relative to the modulating signal. Similarly, another phase-meter 82 receives the heterodyned mixer signal corresponding to the red light component, and also receives the heterodyned mixer signal corresponding to the modulator-driver 20; phase-meter 82 indicating the phase angle for the modulations on reflected red light component relative to the modulating signal. A subtractor, 84, for reasons to be discussed later, provides the difference in phases between the red-light modulation and the infrared-light modulation. Alternatively, this phase difference may be obtained by computation.

In this way, the phase-meters 80 and 82 indicate the phase of the reflected red and infrared light components compared to the reference modulating signal. Thus, available phase meters may be used to measure the phase-angles of high-frequency modulated carrier-wave light beams that have been reflected from a retro-reflector mirror that has been displaced by minor shifts of the earth's crust at a distance as much as 10 miles away.

The optical pathlength, P, over a physical distance L can be expressed as $$P = \int_0^L n\, dx \quad (1)$$

where $n$ is the overall refractive index for a given optical path for a given wavelength.

The optical path, $P$, can also be expressed as $$P = L + S$$

where $S$ is the increase in pathlength—for a given wavelength—due to the atmosphere. For two different wavelengths, there are two optical pathlengths, $P_1$ and $P_2$, and two atmospheric contributions, $S_1$ and $S_2$.

Therefore $$P_1 = L + S_1 = \int_0^L n_1\, dx \quad (3)$$

$$P_2 = L + S_2 = \int_0^L n_2\, dx \quad (4)$$

$$S_2 = \int_0^L n_2\, dx - L = \int_0^L (n_2 - 1)\, dx \quad (5)$$

$$\Delta S = P_2 - P_1 = (L + S_2) - (L + S_1)$$

$$= \int_0^L n_2\, dx - \int_0^L n_1\, dx = \int_0^L (n_2 - n_1)\, dx \quad (6)$$

multiplying by 1 in the form of $\left(\frac{n_2 - 1}{n_2 - 1}\right)$ $$\Delta S = \int_0^L \left(\frac{n_2 - 1}{n_2 - 1}\right)(n_2 - n_1)\, dx \quad (7)$$

If $A = \left(\frac{n_2 - n_1}{n_2 - 1}\right)$ $$\Delta S = \int_0^L A(n_2 - 1)\, dx \quad (8)$$

Since A is a ratio of refractivities, to a first order approximation, it is constant; and can therefore be calculated from laboratory data.

Substituting $S_2$ from equation (5) into (8)

$$\Delta S = A S_2 \quad (9)$$

or $S_2 = (\Delta S / A) \quad (10)$

It will be noted that $\Delta S$ is a change in distance—expressed in centimeters, inches, or any other linear units—and is also a portion of a wavelength expressed as a difference of phase-angles.

Since subtractor 84 of FIG. 1 provides the difference $\Delta S$ between the red and infrared phases, and is thus a distance, this value may be substituted into equation (10). The value of A is known from atmospheric transmission experiments and handbook tables. Therefore, $S_2$ may be computed and substituted into equation (4). Since the instantaneous value of $P_2$ is known, subsequent readings will indicate whether the value of L has changed from a previous reading. In this way, the value obtained for the physical distance L is separated from the values of P produced by the transmission characteristics of the atmosphere.

The above-described equipment has proved to be about 10 times as sensitive as prior-art devices; and has measured movements as small as 10 millimeters over a round trip distance of 34 kilometers. A different apparatus for measuring distances and changes of distance is disclosed in copending patent application entitled "Geodetic Survey System and Digital Phase-Meter Therefor" filed by R. M. Jaffee on June 28, 1967, Ser. No. 649,689, and assigned to the same assignee as this application.

A brief description of the operation follows. Assume that the distance to a retro-reflector is to be measured; and to do this, a light beam is modulated with a very-high-frequency, very-short-wavelength modulating signal. If the modulating signal frequency is gradually decreased, thus increasing the modulating-signal wavelength, the optical pathlength and the modulating-signal wavelength will eventually reach such a relation that an in-phase condition exists at the monitoring station. This condition shows that the optical pathlength is a multiple of the wavelength, but unfortunately one cannot determine the value of the multiple.

If the frequency is again gradually increased, another in-phase condition will occur; but again the optical pathlength will be an unknown multiple of the new wavelength. This procedure may be continued until eventually the wavelength far exceeds the pathlength (which may be determined roughly by map, sightings, radar, etc.); whereupon the last in-phase condition may be used for computing the pathlength and the apparatus described in detail herein provides for increased precision of measurement, accounting for described atmospheric effects.

The opposite procedure is preferable; i.e., to start with an excessively long wavelength, and to gradually decrease its value until an in-phase condition results. At this time the optical pathlength equals the modulating-signal wavelength, and may be computed, to produce a so-called "unambiguous" optical pathlength.

The above procedure implies the use of a variable-frequency modulating signal and an in-phase condition; but as previously indicated, these two features are not essential. For example, an approximate modulating-signal wavelength may be used; and an out-of-phase condition would provide a phase angle. Knowing the wavelength, and the deviation as measured by the phase-angle, one can now compute the optical pathlength.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. The combination comprising:
    means for producing a composite light beam having at least two light components of different frequencies, and includes at least a pair of lasers, and optical means for combining the light from said lasers onto a composite light beam;
    means for impressing a modulating signal onto said composite light beam;
    means for transmitting said modulated composite light beam;
    means for receiving the modulated composite light beam;
    means for producing individual information-bearing signals corresponding to the modulations of the said modulated light components of said received light beam, and includes a pair of photocells and beam-splitter means for splitting said reflected composite light beam into light components and directing said split individual light components to respective ones of said photocells;

heterodyning means for converting said individual information-bearing signals to a frequency lower than the frequency of said modulating signal, and includes at least one heterodyning circuit having a source of oscillations, and a plurality of mixer means for mixing said oscillation from said source with each of said individual information-bearing signals, and with said modulating signal; and means for measuring the phase relation of said individual heterodyned information-bearing signals, and includes a plurality of phase meters, connected between the output terminals of given mixer means, for comparing the phase of each heterodyned information-bearing signal with the heterodyned modulation signal.

2. The combination of claim 1 including a phase subtractor, connected between the output terminals of given mixer means, for comparing the relative phase of the heterodyned information-bearing signals.

3. The combination comprising:
A. means—comprising a pair of lasers producing light components of different frequencies, and optical means for combining the light from said lasers—for producing a two-light-component composite light beam;
B. means, comprising a modulation driver, for causing a modulating signal to modulate said composite light beam;
C. means, comprising a light collimator, for directing said modulated composite light beam to a remotely positioned retro-reflector;
D. means, comprising a concave mirror, for receiving the modulated composite light beam reflected from said retro-reflector;
E. means—comprising a pair of photocells, and beam-splitter means for splitting said reflected composite light beam into light components, and directing said split individual light components to respective said photocells—for producing individual information-bearing signals corresponding to the modulations of said reflected modulated light components;
F. means—comprising at least one heterodyning circuit having a source of oscillations, and a plurality of mixer means for mixing said oscillation with each of said individual information-bearing signals and with said modulating-signal—for producing heterodyned information and modulation signals; and
G. means, comprising a pair of phase meters connected between the output terminals of given mixer means, for comparing the phase of each heterodyned information-bearing signal with the heterodyned modulation signal.

4. The combination of claim 3 including a phase subtractor, connected to the output of given mixer means, for comparing the relative phase of said heterodyned information-bearing signals.

5. The combination combining:
first laser means for producing a first light beam having a first given frequency;
second laser means for producing a second light beam having a second given frequency;
means for combining said two light beams into a composite light beam having two light components;
means for producing a modulating signal;
modulating means for simultaneously amplitude modulating each of said light components in said composite light beam;
means for applying said modulating signal to said modulating means;
means for collimating said composite modulated light beam emitting from modulating means;
means for directing said modulated composite light beam to, and reflecting said composite modulated light beam from, a retro-reflector;
beam-separating means for separating the light components in said reflected modulated composite light beam;
means for directing said reflected composite beam to said beam separator—whereby said beam separator produces two separate light beams corresponding to said two separate light components;
a first photomultiplier tube;
means for directing one of said light components from said beam splitter to said first photomultiplier tube—whereby said first photomultiplier tube produces a first electrical signal corresponding to the modulation of said first reflected light component;
a second photomultiplier tube;
means for directing the other of said light components from said beam splitter to said second photomultiplier tube—whereby said second photomultiplier tube produces a second electrical signal corresponding to the modulation of said second reflected light component;
a first mixer circuit;
means for applying said first electrical signal to said first mixer circuit;
a second mixer circuit;
means for applying said second said electrical signal to said second mixer circuit;
a third mixer circuit;
means for applying said modulating signal to said third mixer circuit;
a local oscillator;
means for applying the signal from said local oscillator to said mixer circuits—whereby said mixer circuits produce heterodyned signals corresponding to input of said electrical signals;
first phase-meter means for measuring the phase between said mixer output signals of said first and third mixer circuits;
second phase-meter means for measuring the phase between said mixer output signals of said second and third mixer circuits; and
subtractor means for measuring the phase between said mixer output signals of said first and second mixer circuits.

* * * * *